US009244868B2

(12) United States Patent
Samanta et al.

(10) Patent No.: US 9,244,868 B2
(45) Date of Patent: Jan. 26, 2016

(54) LEASED LOCK IN ACTIVE-ACTIVE HIGH AVAILABILITY DAS SYSTEMS

(71) Applicant: LSI Corporation, Milpitas, CA (US)

(72) Inventors: Sumanesh Samanta, Bangalore (IN); Sujan Biswas, Bangalore (IN); Horia Simionescu, Foster City, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 279 days.

(21) Appl. No.: 13/623,909

(22) Filed: Sep. 21, 2012

(65) Prior Publication Data

US 2014/0089545 A1 Mar. 27, 2014

(51) Int. Cl.
*G06F 12/00* (2006.01)
*G06F 12/14* (2006.01)
*G06F 13/14* (2006.01)

(52) U.S. Cl.
CPC ...................................... *G06F 13/14* (2013.01)

(58) Field of Classification Search
CPC ........... G06F 9/526; G06F 9/52; G06F 9/524; G06F 9/5077; G06F 17/30362; G06F 17/30171; Y10S 707/99938
USPC ......................................................... 710/200
See application file for complete search history.

(56) References Cited

U.S. PATENT DOCUMENTS

| | | | | |
|---|---|---|---|---|
| 5,283,903 A * | 2/1994 | Uehara | ................. | G06F 15/167 710/200 |
| 5,341,491 A * | 8/1994 | Ramanujan | ............. | G06F 9/524 711/147 |
| 5,454,108 A * | 9/1995 | Devarakonda et al. | ....... | 718/104 |
| 5,596,754 A * | 1/1997 | Lomet | ........................... | 710/200 |
| 5,845,147 A * | 12/1998 | Vishlitzky et al. | ................ | 710/5 |
| 5,892,955 A * | 4/1999 | Ofer | .............................. | 710/200 |
| 5,956,712 A * | 9/1999 | Bennett et al. | | |
| 6,141,720 A * | 10/2000 | Jeffords et al. | .............. | 710/200 |
| 6,216,212 B1 * | 4/2001 | Challenger et al. | ................. | G06F 17/30902 707/999.008 |
| 6,389,420 B1 * | 5/2002 | Vahalia et al. | | |
| 6,697,901 B1 * | 2/2004 | Shun Chan | .............. | G06F 9/52 710/200 |
| 6,826,570 B1 * | 11/2004 | Eshel et al. | | |
| 6,862,666 B2 * | 3/2005 | Chong et al. | .................. | 711/152 |
| 7,080,075 B1 * | 7/2006 | Chan et al. | | |
| 7,328,263 B1 * | 2/2008 | Sadjadi | ......................... | 709/225 |
| 7,917,713 B2 | 3/2011 | Elliott et al. | | |
| 8,543,781 B2 * | 9/2013 | Rawat et al. | .................. | 711/156 |
| 8,560,747 B1 * | 10/2013 | Tan et al. | ...................... | 710/200 |
| 8,868,748 B2 * | 10/2014 | Attaluri et al. | ................ | 709/226 |
| 2002/0052959 A1 * | 5/2002 | Freitas et al. | .................. | 709/226 |
| 2003/0018785 A1 * | 1/2003 | Eshel et al. | ..................... | 709/226 |
| 2004/0117345 A1 * | 6/2004 | Bamford et al. | ................. | 707/1 |
| 2004/0225742 A1 * | 11/2004 | Loaiza et al. | .................. | 709/229 |
| 2006/0101081 A1 * | 5/2006 | Lin et al. | ....................... | 707/200 |
| 2006/0129556 A1 * | 6/2006 | Reuter | ............................. | 707/8 |
| 2006/0184528 A1 * | 8/2006 | Rodeh | ............................. | 707/8 |
| 2007/0185872 A1 * | 8/2007 | Ho et al. | ........................... | 707/8 |
| 2008/0005470 A1 * | 1/2008 | Davies | ........................... | 711/114 |
| 2008/0147934 A1 * | 6/2008 | Nonaka et al. | .................. | 710/74 |

(Continued)

*Primary Examiner* — Faisal M Zaman

(57) ABSTRACT

A method and system for IO processing in a storage system is disclosed. In accordance with the present disclosure, a controller may take long term "lease" of a portion (e.g., an LBA range) of a virtual disk of a RAID system and then utilize local locks for IOs directed to the leased portion. The method and system in accordance with the present disclosure eliminates inter-controller communication for the majority of IOs and improves the overall performance for a High Availability Active-Active DAS RAID system.

21 Claims, 3 Drawing Sheets

(56) References Cited

U.S. PATENT DOCUMENTS

| | | |
|---|---|---|
| 2008/0313301 A1 | 12/2008 | Jewett et al. |
| 2012/0310881 A1* | 12/2012 | Shadmon .................. 707/613 |
| 2013/0067191 A1* | 3/2013 | Mehra et al. .................. 711/173 |
| 2013/0208621 A1* | 8/2013 | Manghirmalani et al. .... 370/254 |
| 2014/0059261 A1* | 2/2014 | Wang et al. .................. 710/200 |
| 2014/0068127 A1* | 3/2014 | Baron et al. .................. 710/200 |

\* cited by examiner ly present invention relates to the field of data processing
and particularly to a method and system for Input/Output (IO)
processing on the same set of virtual disks.

LEASED LOCK IN ACTIVE-ACTIVE HIGH AVAILABILITY DAS SYSTEMS

TECHNICAL FIELD

The present invention relates to the field of data processing and particularly to a method and system for Input/Output (IO) processing on the same set of virtual disks.

BACKGROUND

In Active-Active High Availability Direct Attached Storage (DAS) Redundant Array of Independent/Inexpensive Disks (RAID) systems, two or more controllers may issue IO requests towards the same set of virtual disks. This needs coordination and locking between the controllers. However, conventional locking mechanisms may quickly become a major overhead. Therein lies the need to provide a method and system for IO processing without the aforementioned shortcomings.

SUMMARY

Accordingly, an embodiment of the present disclosure is directed to a method for IO processing in a storage system. The storage system may include a plurality of servers and a shared storage resource. The method may include: designating one of the plurality of servers as a owner server and the rest of the plurality of servers as peer servers, the owner server serving as a single point of overall lock control for the shared storage resource; determining whether a particular window has become a hot window for a particular peer server; sending a lock lease request for the particular window to the owner server when the particular window has become a hot window; retaining the lock lease for the particular window once the lock lease is acquired by the particular peer server; and allowing the particular peer server to process incoming IO requests directed towards the particular window using local locks.

A further embodiment of the present disclosure is directed to a method for IO processing in a storage system. The method may include: designating one of the plurality of servers as a owner server and the rest of the plurality of servers as peer servers, the owner server serving as a single point of overall lock control for the shared storage resource; receiving a lock lease request for a particular window from a particular peer server; determining whether the particular window is currently being leased by another peer server; determining whether there is any outstanding IO request at the owner server that is directed towards the particular window; granting the lease for the particular window to the particular peer server when the particular window is not leased by another peer server and no outstanding IO request is directed towards the particular window; and allowing the particular peer server to process incoming IO requests directed towards the particular window using local locks.

An additional embodiment of the present disclosure is directed to a storage system. The storage system may include a shared storage resource and a plurality of servers in communication with the shared storage resource. One of the plurality of servers may be designated as a owner server and the rest of the plurality of servers may be designated as peer servers. The owner server may serve as a single point of overall lock control for the shared storage resource. Each particular peer server may be configured for: determining whether a particular window has become a hot window for the particular peer server; sending a lock lease request for the particular window to the owner server when the particular window has become a hot window; and retaining the lock lease for the particular window once the lock lease is acquired by the particular peer server. Furthermore, the owner servers may be configured for: receiving the lock lease request from the particular peer server; determining whether the particular window is currently being leased by another peer server; determining whether there is any outstanding IO request at the owner server that is directed towards the particular window; granting the lease for the particular window to the particular peer server when the particular window is not leased by another peer server and no outstanding IO request is directed towards the particular window; and allowing the particular peer server to process incoming IO requests directed towards the particular window using local locks.

An additional embodiment of the present disclosure is directed to a RAID controller. The RAID controller includes an interface module configured for facilitating data communications. The RAID controller also includes a computer-readable storage module having computer-executable instructions for an IO processing method. The method includes: determining whether a particular window has become a hot window based on data access; requesting a lock lease for the particular window when the particular window has become a hot window; retaining the lock lease for the particular window once the lock lease is acquired; and processing incoming IO requests directed towards the particular window using local locks.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

While RAID systems provide protection against disk failure, DAS RAID controllers are defenseless against server failure, since by definition they are embedded inside a server. Therefore, when the server fails, the controller fails as well. Enterprise customers with critical data are therefore asking for two or more node high availability server configurations with DAS RAID controllers embedded.

Figure 1:
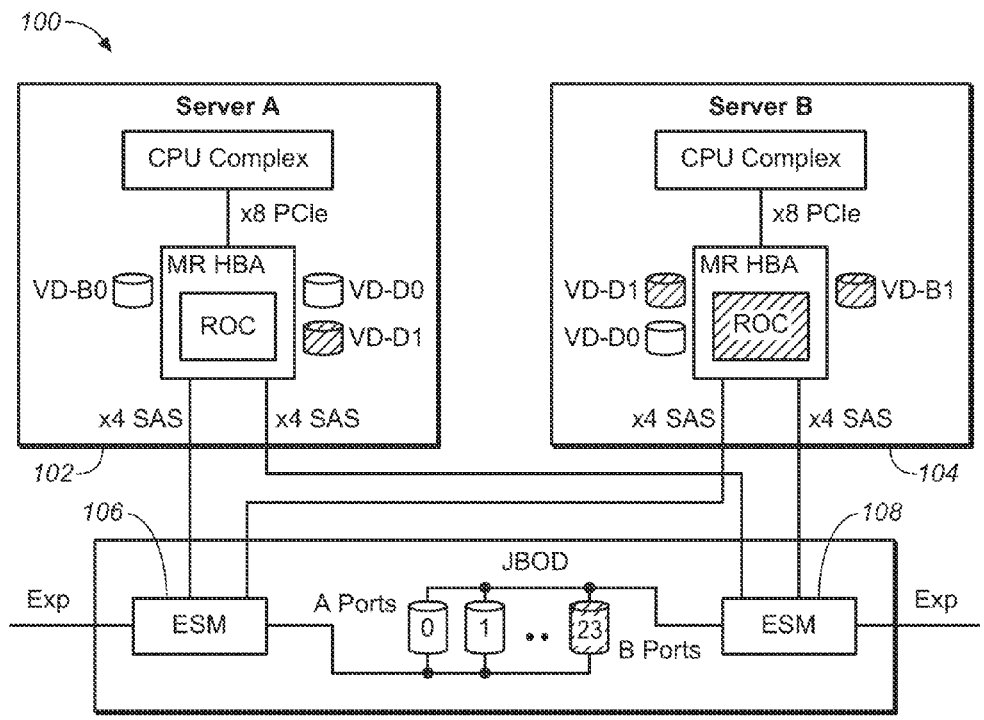
FIG. 1 is a block diagram depicting a high availability architecture.

FIG. 1 is a block diagram depicting a typical high availability architecture 100. Server A 102 and Server B 104 each have an embedded RAID controller, both of which have access to the same set of JBODs in a couple of enclosures 106 and 108 (e.g., ESM as shown in the figure). The enclosures 106 and 108 may be separately powered, so even if one server fails, the other server can take over the shared disks and serve IO without disruption to the upper layer.

RAID systems needs Logical Block Addressing (LBA) range specific region locks to avoid data corruption in certain cases. Such locks may be required even in a standalone server, single controller (single initiator) environment. For example, RAID5 write on a single strip involves updating the parity, which is calculated on a stripe basis, and requires exclusive lock on the entire stripe while RAID5 write is being processed. Similarly, degraded RAID5 read involves reading parity also, and again needs exclusive stripe lock while the read is being processed. Another example is cache (DDR/SSD) flush for all RAID levels. Since we do not want data to be changed when flush is going on, certain types of locking mechanisms may need to be utilized. Furthermore, even for simple RAID levels such as RAID0 and RAID1, we generally take shared locks for regular read and write, but may need to revert to exclusive locks for special operations such as copy back, snapshot creation and the like. It is understood that the list of operations provided above is merely exemplary. Region locks may be needed for various other operations not listed above.

It has been noted that locks are to be taken/looked-up for every IO and hence RAID systems try to optimize locks as much as possible. Currently, for example, more and more implementations move to hardware based lock solutions. This problem, however, magnifies manifold for an Active-Active High Availability DAS system. In such a system, controllers from two or more different servers may independently issue IO requests to the same virtual disk. Therefore, in order to prevent data corruption, lock acquisition has to be coordinated between two or more different servers with potential lock traffic flowing between the servers for every IO. In most cases, lock traffic exchange is required for each "Acquire Lock" and "Release Lock" operation. Since lock traffic exchanges happens over a network by which the servers are connected (e.g., SAS link or other alternate interconnect such as PCIe or the like), such operations reduce the overall system performance.

The present disclosure is directed to a method and system for IO processing. In accordance with the present disclosure, a RAID controller may take long term "lease" of a portion (e.g., an LBA range) of a virtual disk of a RAID system and then utilize local locks for IOs directed to the leased portion. The method and system in accordance with the present disclosure eliminates inter-controller communication for the majority of IOs and improves the overall performance for a High Availability Active-Active DAS RAID system.

More particularly, the method and system in accordance with the present disclosure takes advantage of the principle of locality of reference and the fact that there is very little chance of IO coming in the same LBA range of a virtual disk from multiple servers. In one embodiment, one of the servers in the High Availability Active-Active DAS RAID system will be elected as the "lock owner". It is contemplated that any distributed system leader election algorithms may be utilized for selecting the owner. Once selected, the owner becomes the custodian of the lock, the single point of overall lock control.

All other servers that do not own the lock (may be referred to as peer servers) may go to the owner server (may be referred to simply as the owner) to acquire and release lock. While this can be a solution to distributed locks, it is still not good for performance, as each server still needs to go to the owner for both acquiring and releasing operation.

In accordance with the present disclosure, instead of going to RAID controller of the owner server for each lock acquire and release, the RAID controllers of the peer servers may take a long-term lease of an entire LBA range (may be referred to as a window) of the virtual disk. Once the LBA range is leased to a particular peer server, the RAID controller of that particular peer server may take a local lock and process all IOs directed toward the leased window.

Since there is very little chance of IOs coming to the same window from different peer servers, the long-term lease approach provided in accordance with the present disclosure effectively improves the overall system performance. However, if IOs directed toward the same window from different peer servers do occur, the owner is required to specifically ask the peer server (who holds the lease) to evict the lease. Once the peer server relinquishes the lease, the peer server will need to go to the owner for acquiring every lock as usual.

It is contemplated that the window size (e.g., the size of the LBA range) may vary with implementation and the amount of memory available for metadata management. For instance, smaller the window size, larger the metadata space needed, but on the other hand, finer granularity of lock lease control may be implemented.

It is also contemplated that modern storage systems use physical drives with terabytes of storage spaces, which may lead to virtual disks of many terabytes in RAID systems. While window based tracking of an entire virtual disk is theoretically possible, it may consume a large amount of memory space, which may not be practical, available, and/or feasible. An alternative solution is to use locality of reference and a peer server may take lock lease for only the windows that receive the most frequent IO requests.

Figure 5:
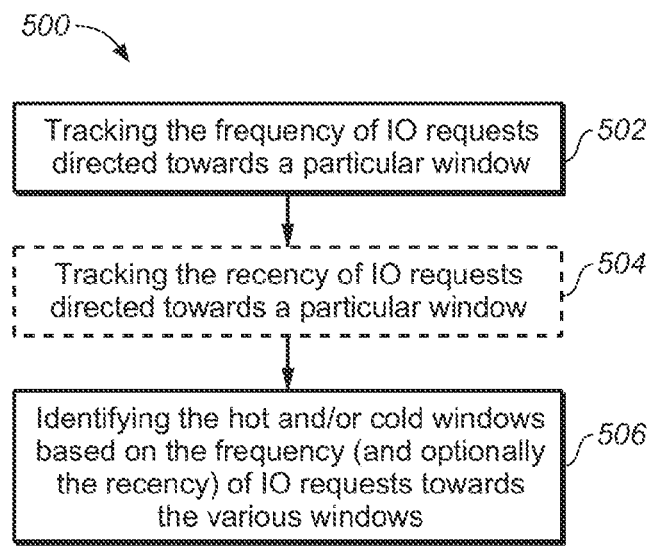
FIG. 5 is a flow diagram illustrating a method for identifying hot windows.

The windows that receive the most frequent IO requests may be referred to as "hot" windows. The windows that receive less IO requests, on the other hand, may be referred to as "cold" windows. It is contemplated that various algorithms may be utilized to identify the "hot" windows as well as the "cold" windows. For example, FIG. 5 shows a high level flow diagram depicting an algorithm 500 for identifying hot and/or cold windows. Step 502 may track the frequency of IO requests directed towards any particular window. The frequency of IO requests directed towards a particular window may be tracked utilizing a counter, a register, a table or the like. Step 506 may then compare the frequency of IO requests directed towards the windows and determine the ones that are most and/or least frequently accessed.

It is contemplated that in addition to tracking the frequency of IO requests, recency of IO requests (e.g., how recent such IO requests occur) may also be tracked as shown in step 504 and taken into consideration for identifying hot and/or cold windows. It is also contemplated that various other algorithms may also be utilized for identifying hot and/or cold windows. Such an algorithm may be referred to as heat logic, and is implemented as a part of the IO processing in each server to keep track of its access patterns.

It is further contemplated that the heat logic implemented as a part of the IO processing in each server is executed continuously and therefore, based on the frequency of IO requests directed towards a given window in comparison with other windows, that window may transition from being a hot window to being a cold window or vice versa. Therefore, each server may utilize a hash table or any storage mechanisms that may facilitate data look up (e.g., a queue, a tree or the like) to keep track of the current list of the hot windows. Keeping track of the hot windows in each server allows that server to decide whether to request a long-term lease for certain windows. This process is described in detail below.

In accordance with the present disclosure, each peer server keeps track of its incoming IOs in terms of windows. A pre-determined window size and a predetermined number of windows are specified. For example, a system design decision may utilize 4 MB window size and 256×1024 number of hot windows. Such a configuration is able to track 1 TB worth of data. In addition, there may be an even larger number of cold windows, which are lighter weight data structures that keep track of number of IO hitting a particular window, even if the window is cold. However, it is understood that the configuration depicted above is merely exemplary. The specific window size and the number of windows may vary without departing from the spirit and scope of the present disclosure.

Figure 2:
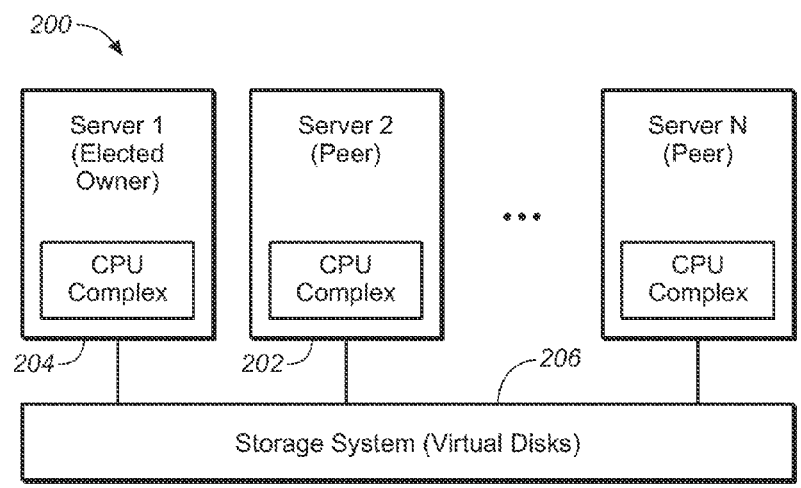
FIG. 2 is a block diagram depicting a storage system including a plurality of servers and a shared storage resource.
Figure 3:
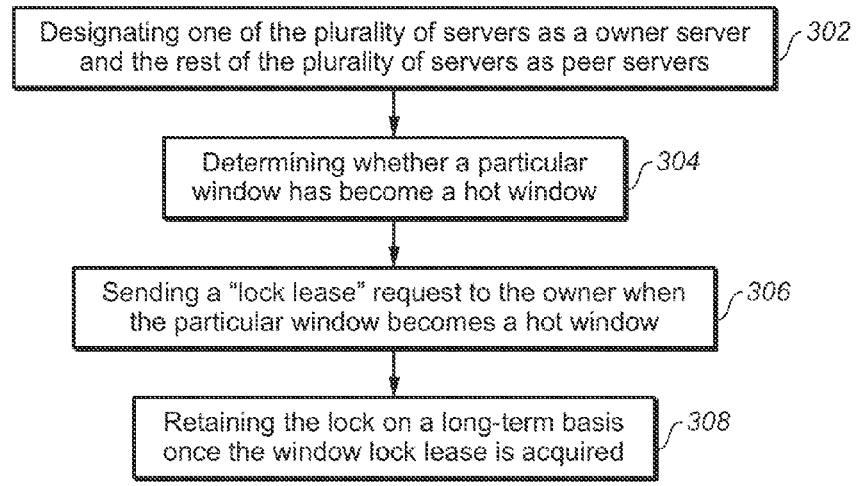
FIG. 3 is a flow diagram illustrating steps performed by a peer server to request a lock lease for a particular window in accordance with the present disclosure.

FIG. 2 is a block diagram illustrating the architecture 200 in accordance with the present disclosure. Each peer server 202 has a CPU complex that includes a processor and computer-executable instructions stored in a computer-readable device (e.g., a memory device). The processor is utilized to execute the instructions to determine whether to lease a portion of the virtual disk 106 on a long-term basis. FIG. 3 is a flow diagram illustrating the steps performed by a peer server to make such a determination. As mentioned previously, step 302 designates one of the servers as the owner server, which serves as a single point of overall lock control for the shared storage resource. Step 304 determines whether a particular window has become a hot window as far as the particular peer server is concerned. When the particular window becomes a hot window, the peer server 202 may send a "lock lease" request to the owner 204 in step 306, asking the owner 204 for a lease on the entire window. Once the window lock lease is acquired, the peer server 202 retains the lock on a long-term basis in step 308. The peer server subsequently processes all IO directed towards this particular window locally. For instance, the peer server may take only a local lock for the IO request being processed. The local lock does not need to go to the owner and lock traffics between the servers are minimized (because global window basis lock has already been taken).

The owner server also has a CPU complex that includes a processor and computer-executable instructions stored in a computer-readable device (e.g., a memory device). The processor may be utilized to execute the instructions to keep track of windows leased to the peer servers. For instance, each leased window may have a corresponding data structure (may be referred to as a window structure) stored in a hash table or any storage mechanisms that may facilitate data look up (e.g., a queue, a tree or the like). For each incoming IO on the owner side, the owner server quickly looks up the window structure in the hash table. If the target window does not have a corresponding window structure in the hash table, the IO is allowed to proceed. If, however, the corresponding window structure is found in the hash table (which means a peer server has already taken a lease on that window), the owner server should send the "evict lease" command to the peer server that holds the lease because the owner server is now getting IO on for the same window.

Figure 4:
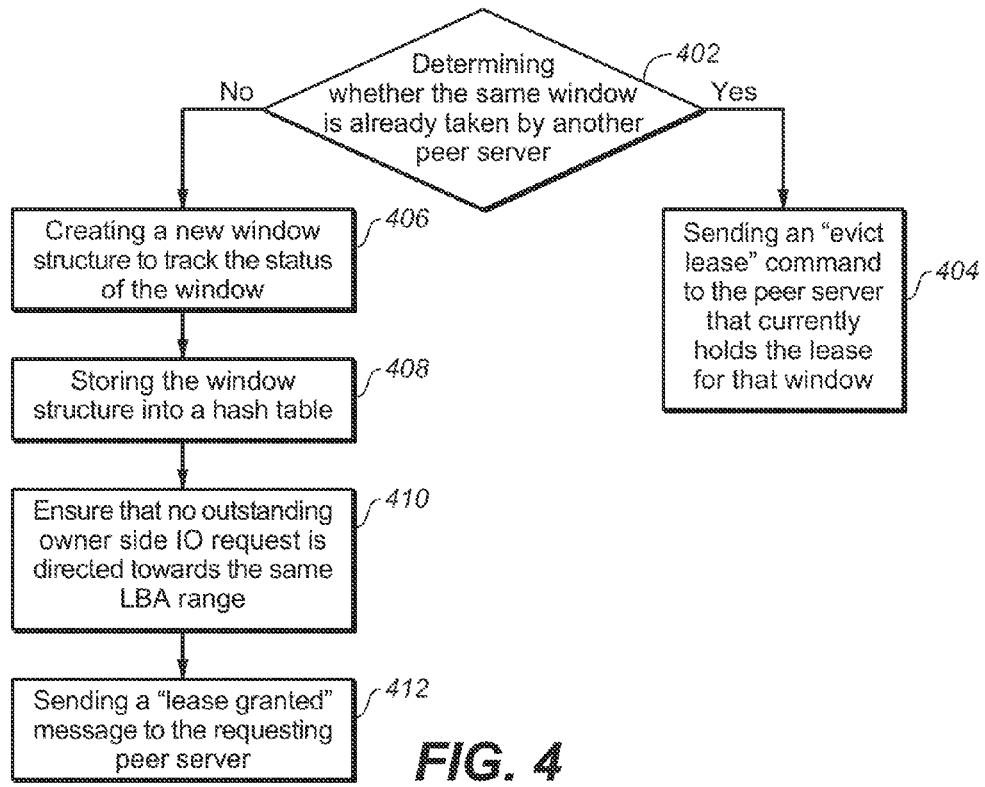
FIG. 4 is a flow diagram illustrating steps performed by a owner server to process a lock lease request in accordance with the present disclosure.

FIG. 4 is a flow diagram illustrating the steps performed by the owner when a "lock lease" command is received from a peer server. Step 402 determines whether the same window is already taken by another peer server. If so, step 404 sends an "evict lease" command to the peer server that currently holds the lease for that window. Otherwise, if the window is not taken, step 406 creates a new window structure to track the status of the window. The window structure tracks which LBA range is being leased and which peer server has taken the lease. Step 408 stores the window structure into a hash table or any storage mechanisms that may facilitate data look up (e.g., a queue, a tree or the like). Step 410 ensures that no owner side IO request is waiting that is directed towards the same LBA range. Subsequently, step 412 sends a "lease granted" message to the requesting peer server. Once the lease is granted, the requesting peer server may start to utilize local locks for IOs directed to the leased LBA range.

In one embodiment, the peer server is allowed to ask for the lock lease for a given window only when that window becomes (transitions to) hot from being cold. There may be a bit (lease acquired bit) in the window data structure that states whether the lock lease for this window has been acquired.

The peer server may release the lock only under one of the following two conditions. In one condition, when the window ceases to be a hot window as determined by the peer server, the peer server may send a "release window" command to the owner to willingly release the window. The owner server, upon receiving the "release window" command, frees the window structure from the hash table (i.e., the lease is no longer being tracked). In another condition, the owner server may specifically ask the peer server to release the lock by sending an "evict lease" command to the peer server. When the owner asks a peer server to evict its lease for a particular window, the peer server needs to: 1) release any local Lock and update data structure so that all further IO requests will go to the owner to acquire a conventional lock, and 2) send a "lease evicted" confirmation to the owner upon completion of the first item. The owner server, upon receiving such a confirmation, frees the window structure from the hash table.

In the event that the owner server asks a peer server to give up the lock (e.g., through the "evict lease" command), the peer server is not allowed to ask for a lease for that window again, unless the window itself becomes cold and again goes through the cold to hot state transition. Such a configuration prevents lock thrashing. In the event that the window is hot, but the lease acquired bit in the window structure is not set (this may happen only if the peer server had to give up the lock per owner's request), the peer server may go to the owner to acquire and release a conventional lock as normal for incoming IO quests directed towards that window.

It is contemplated that an IO request may come to a peer server while its lock lease request is pending with the owner. In such a case the peer server may queue the IO request in a linked list (or the like) waiting for the outcome of the lock lease request. Similar situations and similar solutions may be applied to the owner side when IO request comes to a window that is going through a state transition. It is also contemplated that certain IO requests may cross a window boundary. In such cases, either the IO request can be split at the boundary, or, if the two windows are in the same state (e.g., both are hot windows), the peer server may request the lease for both windows accordingly.

Furthermore, additional error handling logics may be defined to handle situations where a peer server or the owner server fails suddenly. For instance, if a peer server fails while a lease is taken, the owner server may free all windows leased to this peer server and assume any outstanding "evict lease" command sent to the failed peer server is completed. On the other hand, if the owner server fails suddenly, each peer server may detect that the leader (i.e., the owner) has failed utilizing mechanisms such as heartbeat or the like. The peer servers may then elect a new leader, who may become the owner (custodian) for the lock. The peer servers may subsequently go through all of their leased windows and report to the new owner, which may then create corresponding window structures and start to keep track of the windows leased to the peer servers.

It is contemplated that the method and system for IO processing in accordance with the present disclosure may approach the performance of a standalone system since lock traffic between the servers are minimized. Furthermore, while Active-Active High Availability DAS systems are referenced in the examples above, it is contemplated that the method and system for IO processing in accordance with the present disclosure may also be utilized in various other systems having shared storage resources without departing from the spirit and scope of the present disclosure.

Figure 6:
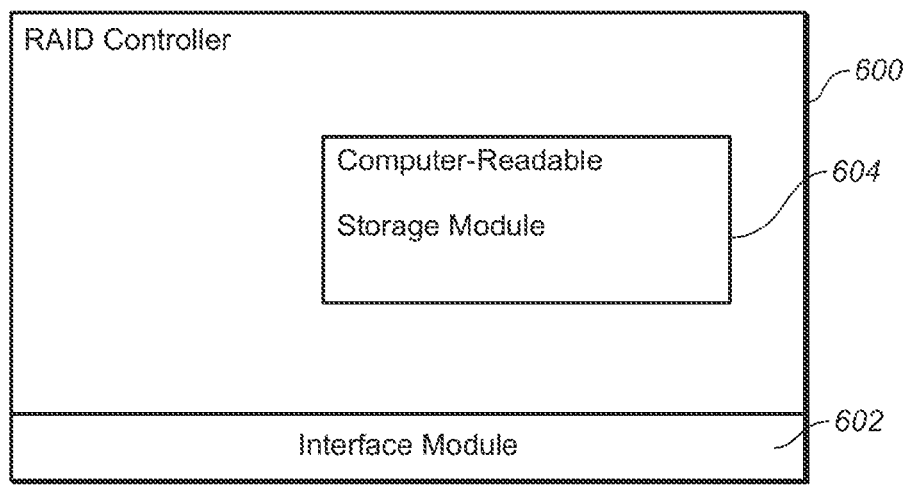
FIG. 6 is a block diagram depicting a RAID controller that implements the processing method in accordance with the present disclosure.

It is also contemplated that while the examples described above refers to servers with embedded RAID controllers, the method and system for IO processing in accordance with the present disclosure are not limited to such embedded RAID controllers. A stand-alone RAID controller (i.e., not an embedded component of a server) may also be configured to implement the IO processing method described above. For instance, a RAID controller 600 having an interface module 602 and a computer-readable storage module 604 is shown in FIG. 6. The interface module 602 provides front-end and back-end interfaces with a computer's host adapter, controlled disks and the like. The computer-readable storage module 604 stores computer-executable instructions and control program for the RAID controller 600. The computer-readable storage module 604 may be implemented using any data storage device, and the computer-executable instructions stored thereof may allow the RAID controller 600, when installed to a computer/server, to enable the computer/server to process IO requests in the manner as described above. Furthermore, it is understood that multiple controllers may be attached to the same server and each controller may be connected to the shared storage.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for IO processing in a storage system, the storage system including a plurality of servers and a shared storage resource, the method comprising:
    designating one of the plurality of servers as a owner server and the rest of the plurality of servers as peer servers, the owner server serving as a single point of overall lock control for the shared storage resource;
    determining whether a particular window has become a hot window for a particular peer server at least partially based on a frequency of IO requests directed toward the particular window;
    sending a lock lease request for the particular window to the owner server when the particular window has become a hot window;
    retaining the lock lease for the particular window once the lock lease is acquired by the particular peer server;
    processing IO requests from the particular peer server directed towards the particular window using only local locks of the particular peer server when the lock lease is retained; and
    conditionally releasing the lease for the particular window, and upon release of the lease for the particular window, the particular peer server is prohibited from sending another lock lease request for the particular window to the owner server unless the particular window transitions to a cold window determined at least partially based on a frequency of IO requests directed toward the particular window and again transitions to a hot window determined at least partially based on the frequency of IO requests directed toward the particular window.

2. The method of claim 1, wherein the lease for the particular window is released when the particular window ceases to be a hot window as determined by the particular peer server.

3. The method of claim 1, wherein the lease for the particular window is released upon receiving an evict lease command from the owner server.

4. The method of claim 3, wherein the evict lease command is issued when another server of the plurality of servers is requesting access to the particular window.

5. The method of claim 1, wherein the particular peer server is configured to withhold IO requests directed towards the particular window received after sending the lock lease request to the owner server and prior to obtaining the lease for the particular window.

6. The method of claim 1, wherein upon a failure of the owner server, the remaining plurality of servers are configured to elect a new owner server.

7. A method for IO processing in a storage system, the storage system including a plurality of servers and a shared storage resource, the method comprising:
    designating one of the plurality of servers as a owner server and the rest of the plurality of servers as peer servers, the owner server serving as a single point of overall lock control for the shared storage resource;
    receiving a lock lease request for a particular window from a particular peer server;
    determining whether the particular window is currently being leased by another peer server;
    determining whether there is any outstanding IO request at the owner server that is directed towards the particular window;
    granting the lease for the particular window to the particular peer server when the particular window is not leased by another peer server and no outstanding IO request is directed towards the particular window;

allowing the particular peer server to process IO requests from the particular peer server directed towards the particular window using only local locks of the particular peer server when the lease is granted;
tracking a status of the particular window;
conditionally sending an evict lease command to the particular peer server; and
prohibiting the particular peer server from sending another lock lease request for the particular window unless the particular window transitions to a cold window determined at least partially based on a frequency of IO requests directed toward the particular window and again transitions to a hot window determined at least partially based on the frequency of IO requests directed toward the particular window.

8. The method of claim 7, wherein the evict lease command is sent when another server of the plurality of servers is requesting access to the particular window.

9. The method of claim 7, wherein upon a failure of the owner server, the remaining plurality of servers are configured to elect a new owner server.

10. The method of claim 7, wherein the owner server is configured to release the lease for the particular window upon a failure of the particular peer server.

11. A storage system, comprising:
a shared storage resource;
a plurality of servers in communication with the shared storage resource, one of the plurality of servers being designated as a owner server and the rest of the plurality of servers being designated as peer servers, the owner server serving as a single point of overall lock control for the shared storage resource;
wherein each particular peer server is configured for:
determining whether a particular window has become a hot window for the particular peer server at least partially based on a frequency of IO requests directed toward the particular window;
sending a lock lease request for the particular window to the owner server when the particular window has become a hot window;
retaining the lock lease for the particular window once the lock lease is acquired by the particular peer server; and
conditionally releasing the lease for the particular window, wherein the particular peer server is prohibited from sending another lock lease request for the particular window to the owner server unless the particular window transitions to a cold window determined at least partially based on a frequency of IO requests directed toward the particular window and again transitions to a hot window determined at least partially based on the frequency of IO requests directed toward the particular window; and
wherein the owner servers is configured for:
receiving the lock lease request from the particular peer server;
determining whether the particular window is currently being leased by another peer server;
determining whether there is any outstanding IO request at the owner server that is directed towards the particular window;
granting the lease for the particular window to the particular peer server when the particular window is not leased by another peer server and no outstanding IO request is directed towards the particular window; and
allowing the particular peer server to process IO requests from the particular peer server directed towards the particular window using only local locks of the particular peer server when the lease is granted.

12. The storage system of claim 11, wherein the lease for the particular window is released when the particular window ceases to be a hot window as determined by the particular peer server.

13. The storage system of claim 11, wherein the lease for the particular window is released upon receiving an evict lease command from the owner server.

14. The storage system of claim 11, wherein the owner servers is further configured for:
tracking a status of the particular window; and
sending an evict lease command to the particular peer server when another server of the plurality of servers is requesting access to the particular window.

15. The storage system of claim 11, wherein the particular peer server is configured to withhold IO requests directed towards the particular window received after sending the lock lease request to the owner server and prior to obtaining the lease for the particular window.

16. The storage system of claim 11, wherein upon a failure of the owner server, the remaining plurality of servers are configured to elect a new owner server.

17. The storage system of claim 11, wherein the owner server is configured to release the lease for the particular window upon a failure of the particular peer server.

18. A Redundant Array of Independent/Inexpensive Disks (RAID) controller, comprising:
an interface module configured for facilitating data communications;
a computer-readable storage module having computer-executable instructions for an IO processing method, said method comprising:
determining whether a particular window has become a hot window at least partially based on a frequency of IO requests directed toward the particular window;
requesting a lock lease for the particular window when the particular window has become a hot window;
retaining the lock lease for the particular window once the lock lease is acquired;
processing IO requests from the particular peer server directed towards the particular window using only local locks of the particular peer server when the lock lease is retained; and
conditionally releasing the lease for the particular window, and upon release of the lease for the particular window, the RAID controller is prohibited from requesting another lock lease for the particular window unless the particular window transitions to a cold window determined at least partially based on a frequency of IO requests directed toward the particular window and again transitions to a hot window determined at least partially based on the frequency of IO requests directed toward the particular window.

19. The RAID controller of claim 18, wherein the lease for the particular window is released when the particular window ceases to be a hot window.

20. The RAID controller of claim 18, wherein the lease for the particular window is released upon receiving an evict lease command.

21. The RAID controller of claim 18, wherein the method further comprises:
withholding IO requests directed towards the particular window received after sending the lock lease request and prior to obtaining the lease for the particular window.

* * * * *